Patented May 1, 1951

2,551,143

UNITED STATES PATENT OFFICE 2,551,143

METHOD FOR THE PREPARATION OF AGAR

Tjoa Sie Lian, Amsterdam, Netherlands

No Drawing. Application July 31, 1947, Serial No. 765,267. In the Netherlands East Indies June 15, 1941

Section 1, Public Law 690, August 8, 1946
Patent expires June 15, 1961

4 Claims. (Cl. 260—209.6)

The invention relates to a method of working for the preparation of agar. It is not possible to obtain agar out of the sea-weed in the East-Indian seas applying the known methods as put into practice in Japan and the U. S. of America. In Japan 5 to 6 kinds of sea-weed are found, out of which agar can be extracted relatively in a simple way, though it takes about 12 hours. If you want to accelerate the extraction you can make use of acids, through which the extraction period can be reduced to about half the time and even less than that.

The sea-weeds, which are found in the neighbourhood of America, also release the agar easily. Without the use of acids the extraction does not take more than 6 to 10 hours.

The quality of the agar is affected however by the use of acids. As the agar from Japan is usually obtained by the use of acids, the quality of this Japan agar is always worse than the American agar; this especially in relation to the viscosity. Moreover the Japan method always requires a bleaching process if you want to get no taste of sea-weed and a good colour in the final product. In the Japan agar this taste is never quite gone while the percentage of salt is high.

With the preparation of the American product infusorial earth and active coal are used for the purification and the decolorization.

In the working up of Indian sea-weeds it appeared that they release the agar with great difficulty so that for an economic working a method with acids should have to be used, which has the great disadvantage that the viscosity greatly suffers from it.

After having taken several tests it is now evident that it is necessary and possible to free the elementary fibres (unit fibrils), out of which the sea-weed is built up from one another in such a way, that the extraction of the agar is made easy. This can be explained from the consideration that the proper agar is inside of such an elementary fibre. These separate fibres are connected by a connective material which checks the elimination of agar from such an elementary fibre, if you want to try to extract agar from the sea-weed without the use of acids.

By "connective-material" is understood the substance which mechanically connects the elementary fibres. To free these elementary fibres from one another according to the invention, the sea-weed is disintegrated (divided very finely) which pulverizing is preferably to be done when the mass is wet. In consequence the connective material gets loose and in the crushed mass, pieces of connective material are found next to the separate elementary fibres (unit fibrils).

The sea-weed is preferably soaked for 12 hours in water before being crushed. Cold water can be used for this. Then this wet sea-weed must pass an edge-runner, in which the first phase of crushing is done, while at last this partly reduced sea-weed is completely disintegrated between two mill-stones. In this condition the weed is extracted to obtain the agar.

Before beginning the extraction the crushed mass is first purified. To this end a great surplus of liquid, preferably cold water, is added and a quantity of water twelve times the weight of the mass usually appears to be sufficient. The connective material is dissolving in the water, while the heavier "unit fibrils" sink. The liquid is sometimes refreshed till it remains clear. A great purification by such a decantation or separation is obtained. This purification can also be done in another way. In this way the pulverized sea-weed is put into a preferably funnel-shaped reservoir (receiver) in which the washing liquid can penetrate from below and flow off at the top of the reservoir. In this reservoir the elementary fibres filled with agar float below while a constant removal of the dissolved connective material and other impurities takes place above. When the outflowing liquid is clear the remaining fibres can be extracted.

The now following extraction of the washed disintegrated mass is done in a warm liquid (usually warm water) of 80–100° C. A quantity of liquid equal to 10 times the weight of the washed mass will usually appear sufficient. The agar is eliminated from the fibre and absorbs water. Now the liquid principally consists of a mixture of an agar emulsion, cellulose and protoplasm. This warm mixture is now sieved or filtrated so that the agar solution is separated from the rest.

When the filtrated solution is cooled it congeals and the agar pudding obtained in the way described above is better than the agar of Japan, though it is obtained without bleaching. The improvement is evident through the greater viscosity. Especially for domestic use a greater viscosity is of importance.

It is apparent that the colouring matter which is in the original sea-weed, practically does not merge into the agar solution through disintegration, treatment with water and filtration afterwards.

The extraction can also be done in countercurrent, in which reservoirs are used into which the washed and crushed sea-weed is put while the water flows through these reservoirs in such a way that the fresh water is brought into contact with the partly extracted sea-weed.

According to the invented method a higher effect is obtained than by applying the known methods. This is explained in this way. Old sea-weed contains a harder layer of connected material than young sea-weed, so that in mere extraction without disintegration the old sea-weed will retain the agar more. By disintegration the elementary fibre of the old as well as of the young sea-weed is freed so that the agar can be completely extracted from the young as well as from the old sea-weed. Consequently this new method can adequately be applied for all sorts of sea-weed.

The defilement of the sea-weed in the extraction without disintegration also exercises a detrimental influence. By disintegration however the elementary fibres are completely separated from the dirt, so that this cannot influence the elimination of the agar from the sea-weed.

In the pudding obtained by congelation according to this method many salts are dissolved just as this is the case with the Japan and American agar.

If you want to remove these salts, you can do so by freezing the pudding and then thawing it; eventually this operation can be repeated after a preceding boiling up.

The final product is a remarkably better agar than that which is now obtainable.

What I claim is:

1. The method of producing agar-agar from seaweed comprising soaking the seaweed until it is entirely swollen up, disintegrating the swollen seaweed to such a fineness that the unit fibrils are readily freed from the enveloping, connective material by washing the disintegrated mass, said connective material being removed with the wash-water, then extracting the agar-agar from the said unit fibrils by cooking, followed by straining and then congealing.

2. The process of producing agar-agar from seaweed, comprising washing and soaking the weed to free it of sand and other foreign matter until it is entirely swollen up, after which the moist weed is disintegrated in such a manner that by washing of the disintegrated mass the unit fibrils are readily freed from the enveloping connective material and the materials which are soluble in cold water are washed away, and the liquid is clear and the soluble materials are separated from the mass of unit fibrils, then extracting the agar-agar from the unit fibrils by boiling the mass, followed by straining and congealing.

3. The method as defined in claim 2 consisting in soaking for at least 12 hours the weed before disintegration.

4. The process of producing agar-agar from seaweed comprising washing and soaking the weed, disintegrating said weed, washing the mass in a reservoir wherein cold water flows upward through the mass separating the soluble materials, the mass of unit fibrils insoluble in cold water remaining behind, then extracting agar-agar from said mass by boiling and straining and congealing.

TJOA SIE LIAN.

REFERENCES CITED

The following references are of record in the file of this patent:

UNITED STATES PATENTS

| Number | Name | Date |
|---|---|---|
| 1,712,785 | Becker | May 14, 1929 |
| 1,814,981 | Thornley et al. | July 14, 1931 |
| 2,011,594 | Seltzer | Aug. 20, 1935 |
| 2,336,562 | Lund | Dec. 28, 1943 |

FOREIGN PATENTS

| Number | Country | Date |
|---|---|---|
| 586,692 | France | Apr. 1, 1925 |
| 63,631 | Netherlands | Feb. 15, 1949 |

OTHER REFERENCES

Despommiers et al. First Addition to Fr. 586,692, No. 31,868, June 18, 1927, 1 page.

Badger and McCabe: "Elements of Chem. Eng.," sec. ed. 1936, p. 434–436, 3 pages.